2 Sheets—Sheet 1.
D. SQUIER.
MACHINE FOR MAKING BROOM-HEADS.
No. 190,095. Patented April 24, 1877.
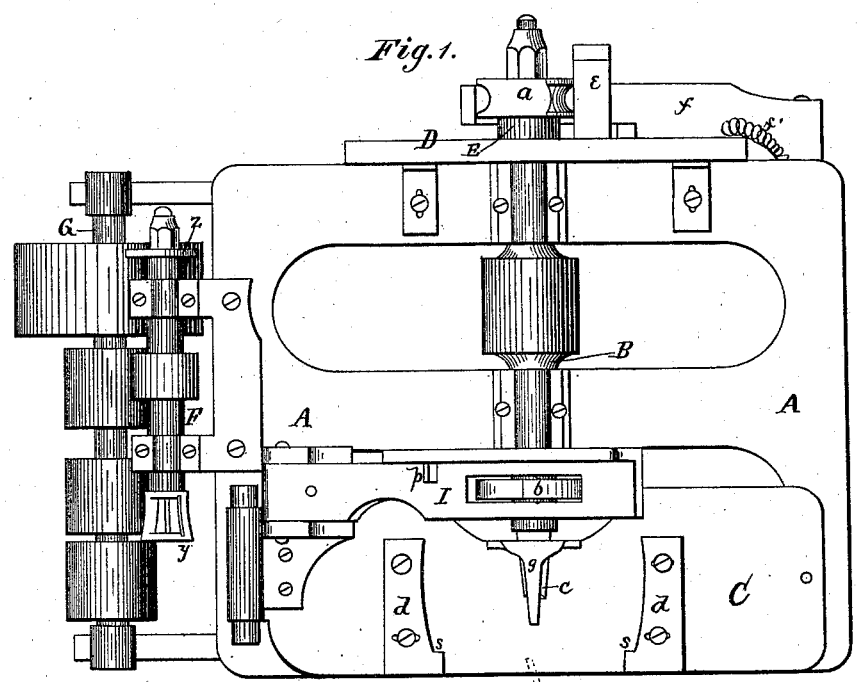
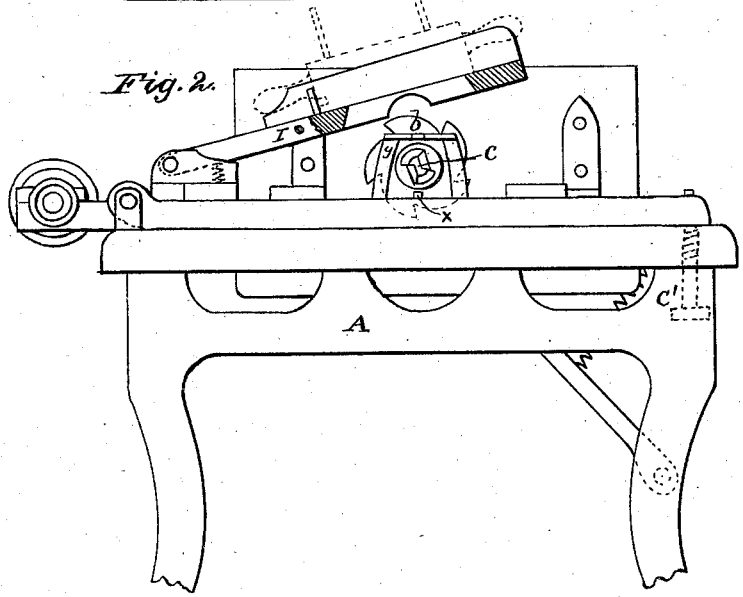
WITNESSES
Henry N. Miller
Joseph C. Wildman
INVENTOR
Daniel Squier,
Alexander Mason
ATTORNEY 2 Sheets—Sheet 2.

D. SQUIER.
MACHINE FOR MAKING BROOM-HEADS.

No. 190,095. Patented April 24, 1877.

WITNESSES
Henry N. Miller
Joseph C. Wildman

INVENTOR
Daniel Squier
Alexander Tucator
ATTORNEY

UNITED STATES PATENT OFFICE.

DANIEL SQUIER, OF BATTLE CREEK, MICHIGAN, ASSIGNOR OF ONE-HALF HIS RIGHT TO JAMES SCOTT, OF SAME PLACE.

IMPROVEMENT IN MACHINES FOR MAKING BROOM-HEADS.

Specification forming part of Letters Patent No. 190,095, dated April 24, 1877; application filed December 14, 1876.

*To all whom it may concern:*

Be it known that I, DANIEL SQUIER, of Battle Creek, in the county of Calhoun, and in the State of Michigan, have invented certain new and useful Improvements in Machines for Making Broom-Heads; and do hereby declare that the following is a full, clear, and exact description thereof, reference being had to the accompanying drawings, and to the letters of reference marked thereon, making a part of this specification.

The nature of my invention consists in the construction and arrangement of a machine for manufacturing wooden blocks for broom-heads, as will be hereinafter more fully set forth.

In order to enable others skilled in the art to which my invention appertains to make and use the same, I will now proceed to describe its construction and operation, referring to the annexed drawings, in which—

Figure 3:
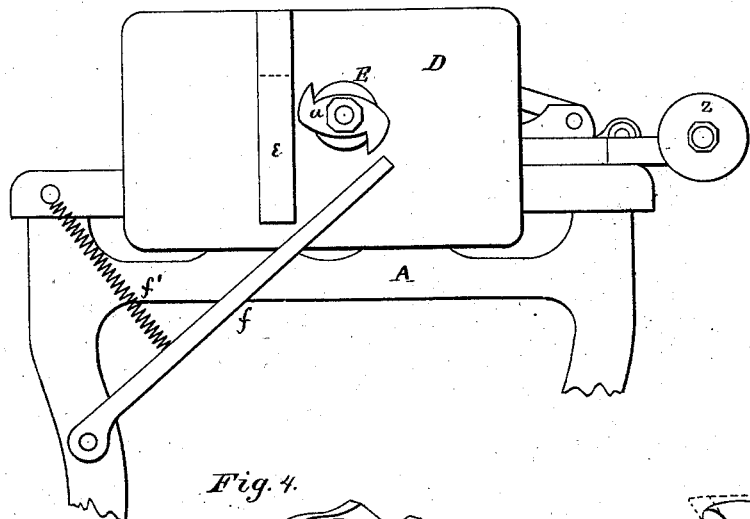
Figure 4:
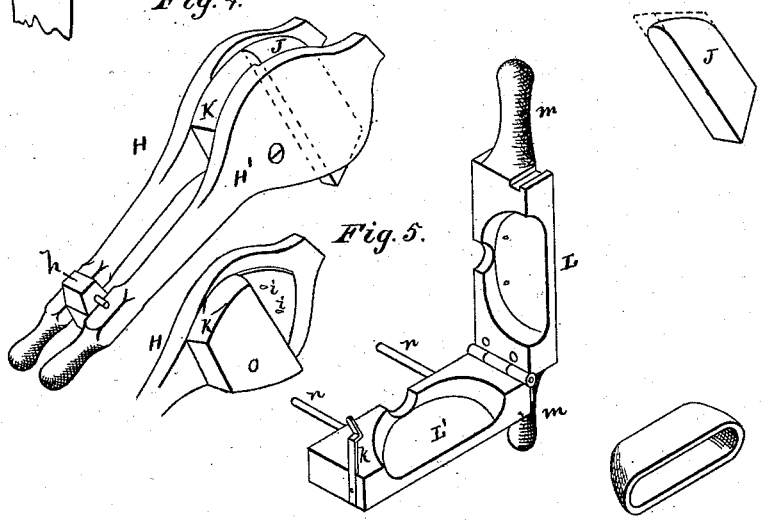
Figure 5:
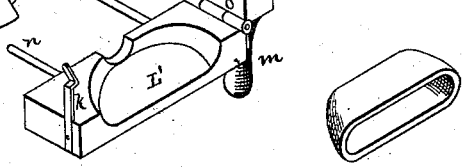

Figure 1 is a plan view of my machine. Fig. 2 is a side elevation of the same. Fig. 3 is a view of the opposite side. Fig. 4 is a perspective view of a swivel-clamp, and Fig. 5 is a perspective view of a lock-box used in my machine.

A represents the frame-work of my machine, constructed in any suitable manner to contain the working parts thereof.

B represents a shaft or mandrel having suitable pulleys and bearings for giving motion to, and carrying, the cutter $a$, saw $b$, and "router" $c$, the latter being of suitable shape to give the desired form to the broom-head.

C represents a horizontal table placed on top of the frame A, and is hinged to the frame at one end, and adjusted up and down at the other end by a set-screw, $c'$, and this adjustable table is provided with adjustable guide-plates $d$ $d$, and carries a hinged spring table or bar, I.

On the other side of the frame A is a vertical table, D, adjustable out and in, as shown, and provided with a stationary L-shaped guard-arm, $e$. Below this table is a pivoted guide-arm, $f$, held upward by means of a spring, $f'$.

E represents a hollow box-guide or guide placed in the vertical table D, and through which the shaft or mandrel B is passed, said box-guide preventing friction and the unnecessary wearing by the ordinary device of enlargement of the shaft or mandrel at this point.

At one end of the machine is a mandrel, F, placed in suitable boxes, and carrying a hollow auger, $y$, for forming a broom-handle, and also an emery-wheel, $z$.

G is the driving-shaft having suitable pulleys for the purpose of imparting motion to the various parts.

In operating this machine the blocks should first be prepared of suitable length, thickness, and width, and one of these blocks is placed in a swivel-clamp constructed in the following manner:

H H' represent two arms or handles, enlarged near one end, as shown in Fig. 4, and to one of these enlargements is fastened a block, K, to which the other arm is pivoted. This latter arm or handle H' is somewhat springy, so as to press on the wooden blank J, which is fastened on teeth $i$ $i$ to the arm H, and thus hold the block in place, the other end of the arm H' being forced up on a projection, $h$, formed on or attached to the arm H.

Having the blank J to be shaped thus firmly in hand, the operator will place the clamp H H' with its side against the vertical table D, passing the block between the table and the guard-arm $e$, with its under side resting on the spring-bar guide, and press it upward and outward, or from him, so as to bring the projecting end of the block in contact with the rapidly-revolving concave cutter $a$, and until the clamp ends strike the fixed box-guide E, when this end of the block is completed.

The clamp with its block is now withdrawn and the whole turned over, so as to present the opposite side of the clamp to the table, when the same process is repeated, and the outside of the broom-head is completed.

The blank J is then removed from the clamp and placed in a lock-box prepared for that purpose. This lock-box is constructed as shown in Fig. 5, and is composed of two parts, L L', hinged together at one end, and fastened at the other end by a spring-catch, $k$. The part L is at each end provided with a handle, m, and when the box is closed one side is opened, as shown, and in the center of the opposite side is a round hole. On this side from the part L' project two guide-pins, n n.

The blank J, being placed in this box, is held by means of suitable teeth in one or both of the parts, and the operator places the lock-box on the spring-table I, with the face of the blank J downward, and the end of the lock-box resting against the stop-pin p thereon and the side of the bar, in which position the whole is firmly held, while the operator presses downward until the movable bar or table I comes in contact with the shaft or mandrel B, during which movement the saw b hollows out the blank J.

The lock-box is now placed on the horizontal table C, with the part L uppermost, and with the guide-pins n n from the operator and the face of the block toward him, when the whole is pressed against the router c and under the guard g, until the lock-box strikes a stop-pin, x, in the center of the table immediately under the router-cutter, and the pins h have passed on either side of the guard g, securing the hole in the middle of the block.

The lock-box is now to be turned and the face of the block presented to the router, when it is carried inward and to the right or left until the right-hand lower corner of the lock-box finds a corresponding notch, s, in the right-hand guide-plate d of the table C, on which the whole is now turned as on a center until the box again strikes the stop-pin x on the table-center. The right arm is now carried forward until the lock-box finds a position parallel with the length of the table, when the inside of the block is just half traversed by the router, so that the reverse of the movements last described of the lock-box before the cutter completes the work of making a broom-head block with my machine.

The fixed guide E in this machine is peculiarly useful, in that it is not subject to the usual wear and tear of devices hitherto used for that purpose, where they form a part of the shaft, mandrel, or other movable part of the machine.

Having thus fully described my invention, what I claim as new, and desire to secure by Letters Patent, is—

1. The combination of the table D, mandrel B, with cutter a, guide-arm e, and spring-bar f, substantially as and for the purposes herein set forth.

2. The combination of the table C with adjustable guide-plates d d, having notches s s, and the router-cutter c, substantially as and for the purposes herein set forth.

3. The combination of the slotted spring-bar I with stop p and the rotating saw b, substantially as and for the purposes herein set forth.

4. The swivel-clamp H H', constructed and used substantially as and for the purposes herein set forth.

5. The lock-box L L', provided with spring-catch k, handles m m, and pins n n, substantially as and for the purposes herein set forth.

In testimony that I claim the foregoing I have hereunto set my hand this 20th day of November, 1876.

DANIEL SQUIER.

Witnesses:
EUGENE STEWART,
GEO. VAN VALIN.